April 22, 1969

W. L. ALBRECHT 3,440,174

METHOD OF MAKING SILICA SOLS CONTAINING
LARGE PARTICLE SIZE SILICA

Filed April 26, 1965

Inventor
William L. Albrecht
By Marzall, Johnston, Cook & Root
Attorneys

United States Patent Office

3,440,174
Patented Apr. 22, 1969

3,440,174
METHOD OF MAKING SILICA SOLS CONTAINING LARGE PARTICLE SIZE SILICA
William L. Albrecht, Naperville, Ill., assignor to Nalco Chemical Company, Chicago, Ill., a corporation of Delaware
Continuation-in-part of abandoned application Ser. No. 165,617, Jan. 11, 1962. This application Apr. 26, 1965, Ser. No. 453,873
Int. Cl. C01b $33/14$; B01j $13/00$
U.S. Cl. 252—313                                6 Claims

ABSTRACT OF THE DISCLOSURE

A method of producing concentrated aqueous stable silica sols which contain at least 35% by weight of large, spherical, nonaggregated silica particles having a weight-average particle of 45–100 millimicrons. Acid sol is fed to an alkaline heel using a controlled feed rate.

---

Figure 1:
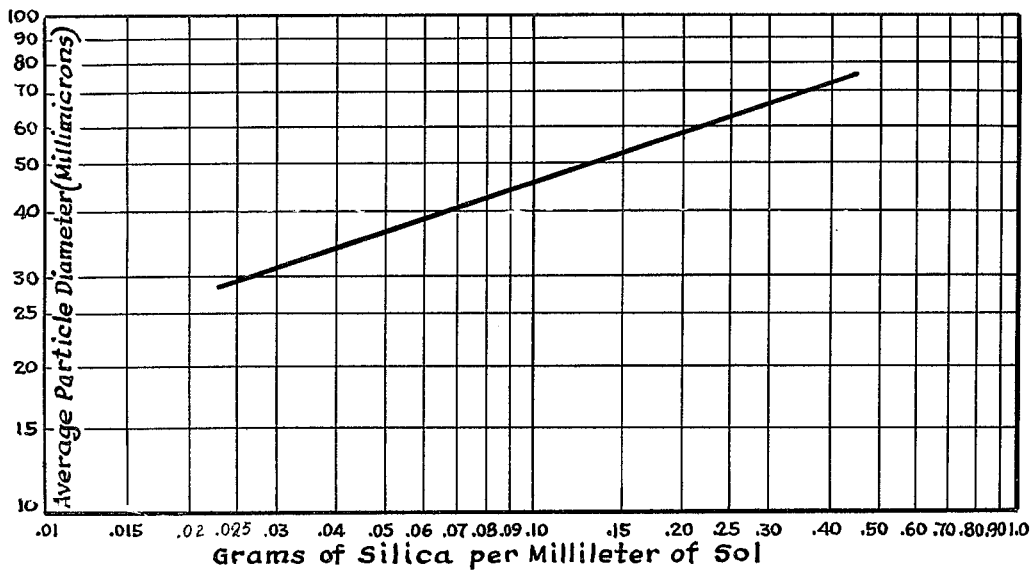

This application is a continuation-in-part of my copending application Ser. No. 165,617, filed Jan. 11, 1962, now abandoned.

This invention relates to concentrated silica sols and method of making same. With more particularity, this invention is concerned with silica sols containing at least 35% by weight of silica in the form of large, discrete, spherical particles having a weight-average particle diameter of from 45 to 100 millimicrons, and a novel process for making the above.

Silica in the form of uniform colloidal dispersions in water and other hydrophilic liquids, commonly classified as silica sols, is well-known in the art. Particularly during the last decade, intensive research has been directed toward improvement of these silica sols and extension of the scope of uses to which they may be applied. Commercial and industrial demands are pressing for a stable siliceous product in the form of a uniform sol which has the additional quality of relatively high concentration of the active ingredient, silica. The benefits of supplying such a product in which the active ingredient, silica, is present in large amounts are obvious. For example, shipping and handling costs are reduced in direct proportion to the silica concentration of the product. In addition, many processes involving the use of such silica sol are effected at a considerable savings when such concentrated silica products are employed as starting reactants or modifiers.

While stability and relatively high concentration of silica are prime considerations in research directed toward the silica sol art, there is an additional growing demand for silica products having the aforementioned properties, which additionally contain silica particles of a relatively large particle size. In many processes the effectiveness is directly related to the particular size of the silica particles which must be uniformly and colloidally dispersed in the liquid hydrophilic carrier. For example, when silica sols are used to delusterize various objects, the "flattening out" effect of the silica sol is a direct proportionate function of the average particle diameter of the silica contained therein. Many other processes call for the use of such large particle size silica in the form of sols, and recently efforts have been redoubled to achieve such large particle size silica sols.

It is evident to one skilled in the art that due to the inherent characteristics of silica, it is an extremely difficult task to produce silica sols which are stable over long periods of time, are concentrated sufficiently to meet practical demands, and yet, additionally, contain silica particles of sufficient size to meet the required high performance values of many treatment processes such as delusterizing and the like.

To some extent the problems of stability and concentration of silica sols have been overcome, although considerable time and efforts are still being directed toward these ends. Efforts, however, to produce relatively large silica particles existing in the form of a uniform sol which has the concurrent properties of stability and concentration have met with little or no success. It is important to many industries employing these sols that the silica particles be kept in a discrete state, that is, in the form of non-agglomerated, spherical particles. Only when the silica particles are in such a form are the free silanol groups on the surface of the particles completely free to react or perform some coactive function according to the particular use for which they are derived. When the properties of concentration, stability and large particle size are all desired in one product with the further proviso that the silica particles remain in a discrete, spherical, non-aggregated form, the problems attendant to the production of such sols are of considerable magnitude. Heretofore, no process is known to have been devised whereby stable, relatively concentrated silica sols containing large, spherical and discrete silica particles have been produced. Efforts toward this end usually result in dilute sols or silica sols which are unstable for the requisite practical amounts of time. Again, many of the same processes involving production of concentrated and/or stable silica products have the disadvantage that only a minor percentage of large silica particles are produced and results from the desired use are unsatisfactory. On the other hand, efforts to increase the silica particle size of known silica sols have only resulted in substantial agglomeration of the silica through silanol condensation-type reactions. These agglomerates of silica, as mentioned before, are often useless in many processes. These non-spherical or irregular agglomerates are joinned by siloxane bonding and are not only undesirable because of size and irregularity, but also have the added disadvantage of low required activity in additive treatments. In short, while these agglomerated silica particles measure above say, 40 or 50 millimicrons as determined by supercentrifuging technique or some type of light refraction method, the ultimate size of the component silica particles is well below this range as determined from measurement in electron microscope photographs. These small particles have been merely joined into tight network by siloxane bonding to produce the aggregates thereof with the aforementioned deficiencies.

In the current work toward achievement of a concentrated stable silica sol containing silica of relatively large weight-average particle diameter, many of the prior art techniques were thoroughly investigated and subsequently discarded in view of their inadequacies with regard to all or several of the desired properties.

One of the earlier disclosed methods of building up the size of silica particles is discussed in Bechtold and Snyder, U.S. Patent 2,574,902. Following the techniques outlined in this prior art disclosure, the following run was made: 40° Bé. commercial sodium silicate with a $SiO_2:Na_2O$ ratio of 3.25:1, containing 28% $SiO_2$, was diluted to about 4% $SiO_2$ with deionized water and passed through a bed, 1¼ inch diameter x 15 in. of Nalcite HCR, a sulfonated styrene divinylbenzene copolymer cation exchange resin in the hydrogen form which had been backwashed and well rinsed. Through this ion exchange technique the sodium silicate was converted to silicic acid or what is commonly known as active silica. 900 ml. of this acid sol with a pH of 2.9 measured with a Beckman Model G pH meter, glass electrode vs. calomel, calibrated against pH 7 buffer, were adjusted with 14 ml. of 1 N NaOH to give a sol with a $SiO_2:Na_2O$ ratio of 85:1 and a pH of 7.2. 425 ml. of this sol were charged to a 500 ml., 3-necked, round-bottomed flask equipped with stirrer, calibrated addition funnel, and vapor take-off with removable stopper for sample withdrawal from or material addition to the flask, and external heater. This reaction flask was heated and refluxed under atmospheric pressure for 1 hour to form a heel. The alkalized sol was then fed into the reaction flask so as to maintain constant volume during removal of water by distillation. 300 ml. of 4% $SiO_2$ feed and 1900 ml. of 3.8% $SiO_2$ feed, all alkalized to a $SiO_2:Na_2O$ ratio of 85:1, were introduced over a period of 9½ hours, at which point the sol contained 36.5% $SiO_2$ at a pH of 9.33 with a viscosity of 14.3 centipoises as measured on a Brookfield Model LVF Viscometer. The sol so produced was turbid and hazy, with a turbidity index of 0.150 cm.$^{-1}$ at 10% $SiO_2$. The $SiO_2$ concentrations in the acid sol as well as in all other sol samples in this run and those runs described hereinafter, were determined from specific gravity measurements.

During the above run, 25 ml. samples for analyses were pipetted from the reaction flask after stopping the feed and continuing heat input for about 5 minutes to effect complete reaction of the active silica. Portions of these samples were titrated to determine specific surface area as described in Analytical Chemistry, vol. 29, p. 1981 ff.

The number-average particle diameters were obtained from these specific surface area determinations by the relationship $D=3000/S$, where D is the average particle diameter in millimicrons and S is the specific surface area in $M^2/g$. $SiO_2$. Constant volume was maintained in the reaction flask, by adjusting the feed rate between sample removals; a new volume was established after each sample removal so that particle concentration was not changed.

Table I describes the results of the various titrated samples withdrawn during the reaction at the various silica concentration levels in the heel. It must be noted that the maximum number-average silica particle diameter that was achieved is 12.7 millimicrons. While, of course, some silica particles occur as larger size particles throughout the colloidal particle range, the proportion of these as compared to the bulk of the silica particles is small.

The final sol product from the Bechtold and Snyder process was also measured to determine its maximum weight-average particle diameter by means of turbidity studies. The procedure used to measure the weight-average particle diameter was that outlined in Kolloid-Zeitschrift, vol. 173, No. 1, pages 38–48 (1960). These measurements were made with a Klett-Summerson Photoelectric Colorimeter using a 1.25 cm. cylindrical cell and a 400 m. filter. Using this technique the final sol product was found to have a maximum weight-average particle diameter of 24.4 millimicrons. In other words, whether speaking in terms of a number-average or a weight-average, the average particle diameter of these silica particles are well below 45 millimicrons in size. Further particle build-up was impossible due to gellation or precipitation of the solid silica particle phase.

TABLE I

| Ml. feed added | Time, hours | pH | Percent $SiO_2$ | Conc., g. $SiO_2$/ml. | D, mu |
|---|---|---|---|---|---|
| 0 (heel) | 0 | 8.14 | 4 | .041 | 5.3 |
| 300 | 1¼ | 8.50 | 7.8 | .082 | 7.4 |
| 850 | 3½ | 8.82 | 13.4 | .145 | 9.1 |
| 1,300 | 5½ | 9.01 | 19.5 | .219 | 10.9 |
| 1,900 | 8½ | 9.22 | 29.5 | .354 | 12.0 |
| 2,200 | 9½ | 9.33 | 36.5 | .463 | 12.7 |

While the sols produced by the Bechtold and Snyder method are sufficiently stable for practical periods of time, their inadequacies with regard to relatively low $SiO_2$ concentration and low average particle diameter are apparent.

Rule in U.S. Patent 2,577,484, describes an improved method over Bechtold and Snyder silica particle build-up by again using a feed-heel technique. The following is a typical run made according to the Rule method. An acid sol of the type described above, with a pH of 2.8, was passed through Nalcite WBR (aminated styrene divinylbenzene copolymer weak base resin) in the free base form to give a deionized active silica with a pH of 3.25 containing 3.7% $SiO_2$. To 425 ml. of this sol was added 6.65 ml. of 1 N NaOH to produce an alkalized sol with a pH of 6.33 and a $SiO_2:Na_2O$ ratio of 150:1. This sol was then refluxed for 90 minutes. The pH of the resultant heel was 7.84 at 25° C. The heel was heated to boiling and the addition of deionized acid sol was started. Sufficient base was also added from time to time to maintain the $SiO_2:Na_2O$ ratio of 150:1. For each 200 ml. of feed added there was also added 1.2 ml. of 1 N NaOH. The feed and boil-off were continued for 11 hours, at which time the sol contained 31.8% $SiO_2$ at pH of 8.9 with a viscosity of 129 cps. After this time a scale-like precipitate had formed in the bottom of the flask indicating that further concentration was impossible. A total of 2700 ml. of feed and 16 ml. of 1 N NaOH were added. At appropriate intervals, test samples were withdrawn from the reaction. The finished sol was turbid and quite cloudy with a turbidity index of 0.211 cm.$^{-1}$ at 10% $SiO_2$.

Table II below shows the physical characteristics of the various sol samples withdrawn during the specific run.

TABLE II

| Ml. feed in | Time, hours | pH | Percent $SiO_2$ | Conc., g. $SiO_2$ ml. | D, mu |
|---|---|---|---|---|---|
| 0 (heel) | 0 | 7.84 | 3.6 | .037 | 4.7 |
| 300 | 1 | 8.12 | 7.3 | .076 | 6.6 |
| 400 | 3½ | 8.39 | 14.6 | .159 | 9.1 |
| 1,500 | 6¼ | 8.66 | 21.1 | .239 | 11.6 |
| 2,100 | 8¾ | 8.70 | 26.9 | .318 | 13.9 |
| 2,700 | 11 | 8.90 | 31.8 | .388 | 16.0 |

The weight-average particle diameter of the final sample as determined by the aforementioned turbidity technique was 31.3 millimicrons. The same inadequacies discussed above with regard to the Bechtold and Snyder process are also evident here. Again, the maximum average particle diameter that may be reached whether speaking in terms of a number or weight average is below 45 millimicrons. Even the most concentrated sol samples had an average particle diameter under this figure. Moreover, it was virtually impossible to concentrate the sol containing the largest particles at the end of the run, to a point much above 35% silica concentration. Toward the end of the experimental run substantial amounts of scale-like precipitate had formed and further concentration only resulted in increased silica precipitation out of the continuous liquid aqueous phase.

Another method of effecting silica particle build-up is revealed in Reuter et al., U.S. Patent 2,929,790. The method disclosed therein was followed according to the following general procedure: Two liters of acid sol produced as described above were adjusted to a pH of 8.60 using the same commercial sodium silicate as was used in production of the acid sol. 1350 ml. of this alkalized sol with a $SiO_2$ content of 4.4% were charged to a 2 liter flask and evaporated at atmospheric pressure to 475 ml. This heel contained 12.6% $SiO_2$ at a pH of 10.3. 425 ml. of this heel were then charged to a reaction flask and brought to a boil while stirring vigorously. Addition of acid sol, containing 3.9% $SiO_2$ at a pH of 2.85 was started. During the addition of the remainder of the sol constant volume was maintained. 2400 ml. of feed were added during 10¼ hours at which point the sol contained 35.5% $SiO_2$. The finished sol had a pH if 9.02 and had a viscosity of 5.2 cps. The sol was turbid, but not cloudy with a turbidity index of 0.058 cm.$^{-1}$ at 10% $SiO_2$.

Physical data from the samples collected during this run is presented below in Table III.

TABLE III

| Ml. feed in | Time, hours | pH | Percent SiO$_2$ | Conc., g. SiO$_2$ ml. | D, mu |
|---|---|---|---|---|---|
| 0 (heel) | 0 | 10.34 | 12.6 | .136 | 6.2 |
| 300 | 1¼ | 10.11 | 15.5 | .170 | 6.6 |
| 450 | 2 | 10.00 | 16.4 | .181 | 6.7 |
| 1,000 | 4½ | 9.68 | 22.0 | .251 | 7.9 |
| 1,500 | 6¼ | 9.40 | 27.0 | .319 | 8.9 |
| 2,000 | 8¼ | 9.20 | 31.8 | .384 | 9.6 |
| 2,400 | 10¼ | 9.02 | 35.5 | .445 | 10.9 |

The weight-average particle diameter of the final concentrated product was also determined and found to be 17.4 mu.

As in the previous two experimental runs, this experiment also demonstrates that the achievement of a silica sol containing relatively large average diameter particles of silica was not available. As in the above discussed prior art disclosures, the products produced by this method may well contain silica particles having various diameters over a wide range of sizes. Again, however, whether a determination is made on the basis of a weight-average silica particle diameter or a numerical average thereof, results show that such an average diameter falls below 45 millimicrons in size.

Broge et al., U.S. Patent 2,680,721 also describes a method of increasing the size of unaggregated silica particles. In this process the same type of acid sol as described above is alkalized, then pumped under high pressure through an extremely long stainless steel pipe immersed in a molten salt bath or some other type of appropriate container. The pressure in this process must be maintained at a relatively high level and the sol is heated at tempreatures from 160 to 300° C. While large particle size colloidal silica is produced, the process has the inherent disadvantage that only relatively dilute concentrations of silica may be produced, for example, around 3% silica. Concentrated products above 35% silica content are unable to be synthesized using the method of this reference. Moreover, the expense of the process equipment involving high temperature and high pressure requirements, and the various steps involved make the process unattractive from this viewpoint. Thus, by following the method of Broge et al., the achievement of stable highly concentrated silica sol products has been sacrificed to achieve silica particle sizes in excess of 45 millimicrons.

Much work has been done by Alexander and Iler, with regard to determination of particle sizes in colloidal silica. In their article from the Journal of Physical Chemistry, vol. 57, p. 932, they have slightly modified the Bechtold and Snyder method described above for use in their investigation. By continuously withdrawing samples, 51 in all, during the run, the authors were able to analyze the fractions for particle size distribution using electron micrographs. While their work was done primarily to show the difference obtained between a determination of weight-average particle diameter, the number average diameter and the surface average diameter, of silica particles the autors additionally prove that only in the final few fractions were relatively large silica particles produced. Most of the fractions showed that the vast percentage of particles were well below 45 millimicrons in size.

In the above cited work, Alexander and Iler show the addition of alkalized acid sol, containing 2.4% silica, to a commercially available alkaline sol containing approximately 30% silica. By a carefully controlled combination of continuous product removal and distillation of water, the silica content of the sol in their evaporator was maintained at 30%. As evidenced by analyses of several sample fractions removed during the experiment, the average diameter of the silica particles increased to a final value of about 60 millimicrons. During the experiment, no concentration of silica in the evaporator was achieved, and, indeed, it is very difficult to achieve concentrations much above 30% SiO$_2$ by the Bechtold and Snyder method without causing gelation of the silica or a drastic increase in the sol viscosity resulting in unusuable produtcs. The removal from the evaporator of significant amounts of the product sol, as practiced by Alexander and Iler, would, of course, be an unattractive process from an industrial viewpoint, as the yield of silica in the final product would be a small fraction of the total silica used in the process. Concentrated large particle silica sols above about 35% silica concentration could not be produced by a practice of this technique.

In view of the above discussed desiderata, it is evident that the prior art techniques all fail with regard to at least one or more of the desired properties of silica concentration, stability and/or large average particle diameter of colloidal silica. It would be a substantial improvement in the art if stable silica sols of at least 35% silica content and having average silica particle diameters of above 45 millimicrons could be produced in a simple, economical, single-step process.

It therefore becomes an object of the invention to produce concentrated stable silica sols having average particle diameters in excess of 45 millimicrons.

Another object is to produce these same stable concentrated large particle size silica sols by a simple single-step process.

A specific object of the invention is to produce silica sols having water as the continuous phase and containing 35–60% by weight of uniform, non-aggregated silica particles having a weight-average particle diameter from about 45 to about 80 millimicrons.

A still further object is to produce concentrated stable silica sols containing large silica particles by the process of treating a silica sol in such a manner that the starting silica particles are uniformly increased in diameter to from 2.5 to 4.0 times the original diameter, such uniform build-up being effected according to a predetermined silica addition rate formula.

A still further object is to provide stable concentrated silica sols containing large, spherical, uniform, non-aggregated discrete silica particles with an average diameter of at least 45 millimicrons which have particular use in such processes as delusterizing and the like.

Other objects will appear hereinafter.

In accordance with the invention it has been found that concentrated stable silica sols containing at least 35% by weight of large, spherical, uniform, non-aggregated silica particles having a weight-average particle diameter of from about 45 to about 100 millimicrons may be prepared by a novel process. In broad terms this process comprises the steps of adding an acidic silica sol containing silica particles with an average molecular weight of less than 90,000 to a dilute aqueous alkaline silica sol containing less than 3.5% by weight of solid silica particles having a weight-average diameter of from about 10 to about 30 millimicrons. This addition of acid sol to alkaline sol is maintained, while continuously evaporating the liquid aqueous phase of the alkaline sol at atmospheric conditions, according to the following rate formula:

$$F = kc_t^{2/3} C_0^{1/3} S_0$$

where F is the maxmium feed rate at anytime of the acidic silica sol in grams of silica contained therein per milliliter of alkaline sol per hour, $k$ is a constant with a value of $5 \times 10^{-3}$ when the temperature of the reaction is about 100° C., $C_t$ is the silica concentration of the alkaline silica sol in grams per ml. at any time, $C_0$ is the initial silica concentration of the alkaline silica sol, and $S_0$ is the initial specific surface area of the silica of the alkaline sol in square meters per gram of silica, all silica contents being expressed as SiO$_2$. If the addition is maintained according to the above rate formula and the pH of the alkaline sol is maintained over 7.0 units, the weight-average silica particle diameter of the starting silica sol may be uniformly increased until sol products having a silica particle diameter of 45–100 millimicrons are achieved. Preferably the starting silica particle diameter is typically increased from 2.5 to 4.0 times according to the invention. The final products exhibit this uniform increase of particle diameter since they themselves, are spherical and uniform in appearance with substantially no agglomeration having taken place during the process.

The term "weight-average particle diameter" is defined as the diameter of a single silica particle which has an average molecular weight representative of the total mass of silica in the sol.

PROCESS OF THE INVENTION

Starting alkaline sol

As generally discussed above, any alkaline silica sol containing silica particles having a weight-average diameter of from about 10 to about 30 millimicrons may be suitable for use as a starting sol in the process of the instant invention. The silica particles must be discrete entities and spherical in form having at least the weight-average diameter above. In other words, agglomerated or reticulated silica particles in the form of sols thereof are not contemplated for use in the invention. The silica particles of these alkaline sols have specific surface areas which may vary from 45 to 300 $M^2/g$. $SiO_2$.

As has been described above, much of the prior art has been concerned with production of silica sols containing silica particles of less than about 45 millimicrons in average diameter. These prior art finished sols are admirably suited as reactants in the instant invention. It is essential, however, that the weight-average silica particle diameter be at least 10 millimicrons. More preferably the weight-average particle diameter of the starting sol may range from 15 to 25 millimicrons. Sols, as produced by the methods: Bechtold et al., U.S. Patent 2,574,902; Rule, U.S. Patent 2,577,484; Reuter et al., U.S. Patent 2,929,790, may be used as my starting alkaline sols. Other typical starting silica sols may be made by resort to U.S. Patents 2,601,235, 2,680,721 and 2,929,790.

In addition to the alkaline silica sols described in the above references, resort may be had to those sols generally characterized as "deionized." These sols may be either completely deionized by a mixed resin bed treatment or may be merely decationized by the appropriate resin. However, when using these type sols it is necessary to add thereto sufficient alkalinity by use of alkali metal hydroxides or alkali silicates so that the pH is adjusted to at least 7.0 units.

Again, the starting silica sols employed in the invention may contain any type of hydrophilic liquid carrier without departing from the spirit of the invention. However, for practical considerations, it is preferred that the liquid phase of the starting alkaline silica sol be water.

Typical commercially available silica sols which may be used as the starting alkaline sol materials are those silica sols which are sold by the Nalco Chemical Company under the trademark "Nalcoag." The physical and chemical properties of these types of silica sols are set forth in Table IV.

TABLE IV

|  | Sol I | Sol II | Sol III |
| --- | --- | --- | --- |
| Percent colloidal silica as $SiO_2$ | 30–31 | 35–36 | 49–50 |
| pH | 10.2±0.2 | 8.6±0.1 | 9.0±0.1 |
| Viscosity at 77° F. cps | <5 | <5 | 20–30 |
| Specific gravity at 68° F | 1.205–1.21 | 1.248–1.255 | 1.385–1.394 |
| Surface area, $M^2$ per gram $SiO_2$ | 190–270 | 135–190 | 120–150 |
| Average particle size, millimicrons | 11–16 | 16–22 | 20–25 |
| Density, # per gal. at 68° F | 10.0 | 10.5 | 11.6 |
| Freezing point ° F | 32 | 32 | 32 |
| $Na_2O$ percent | 0.40 | 0.10 | 0.30 |

As before mentioned, almost any type of alkaline silica sol may be used for the invention as starting material, which has a weight-average particle diameter of from 10 to 30 millimicrons in size. However, more preferable starting alkaline silica sols are those which contain silica particles having a weight-average particle diameter of from 15 to 25 millimicrons.

The pH of the starting alkaline silica sol must be maintained above 7.0 during the whole of reaction. If the alkaline sol during the process is allowed to become more acid or the pH is allowed to fall below 7.0 units the danger of gelation is greatly increased. In view of this, it is preferred that the pH of the starting alkaline sol range between 7.5 and 11.0 and more preferably between 8.5 and 10.0.

The problem of maintaining the proper alkalinity can be overcome by two approaches. In one embodiment, the pH can be periodically adjusted by addition of the appropriate basic substance at various intervals during the reaction. If the alkalinity is periodically adjusted, it is preferred that the pH of the alkaline silica sol be maintained within the range of 7.0 to 10.0. Any appropriate substance may be used which is a sufficiently strong base so that relatively small amounts are necessary to maintain the proper pH and which does not form an insoluble silicate. However, such substances as alkali metal hydroxides and alkali metal silicates as sodium hydroxide and sodium silicate may be used to best advantage.

In another more preferred embodiment, sufficient alkalinity is introduced into the starting alkaline silica sol, before any acid sol is added thereto, so that during the course of the reaction no further addition of alkaline substance is necessary. If such is desired, the pH is properly adjusted by putting in basic materials such as alkali metal hydroxides and alkali silicates, so that it ranges between 9.5 and 11.5 units. More preferably the pH is adjusted before any acid sol is added so that the initial pH is 10.0–11.0.

Another very important consideration is the concentration of the alkaline silica sol. It has been affirmatively determined that regardless of the particular source of alkaline sol used, it must be rendered dilute either by addition of water or some hydrophilic organic substance, in order to achieve the desired uniform coating reaction. Preferably the starting alkaline silica sol is aqueous and has been diluted with water below about 3.5% concentration of solids by weight. More preferably, however, the silica solid content of the starting silica sol is adjusted between about 0.5 and 2.5%.

Acid sol

The particular acid sols used as the active coating reagents may be produced by a wide variety of methods. All of these particular sols have average molecular weights below about 90,000. More preferably these acid sols contain silica particles having an average molecular weight of from about 1000 to 46,000. The pH of these acid sols is below 5.5 and more preferably they lie within the range of 2.5 and 3.5.

One method of preparing such acid sols is to neutralize water glass with a mineral acid. In using this method to form the acid silica sols it is necessary, however, to remove the major portion of the salts formed by neutralization reaction. This may be accomplished by dialysis or electrodialysis, but these procedures are not not adaptable to large scale economic production. An improved method for preparing acid sols has been described in Bird, U.S. Patent 2,244,325. By utilizing the teachings of this patent the preferred starting acid sols are produced. According to the Bird method a water glass (alkaline silicate) solution is passed through a column of cation exchange material in the hydrogen form whereby the alkali metal in the water glass is exchanged for hydrogen and the resultant product is an acid silica sol of unusual purity. Generally, the pH of the sols so produced lie within the range of 2.0–4.0. In addition, the average molecular weight of the silica particles is well below 90,000.

Other acid sols suitable for use in the invention may be prepared by a variation of the Bird method described above. In this embodiment the effluent from the Bird process may then be further treated by passing it through a weak base resin in the free base form. The resultant product is then substantially stripped of any ions and is generally known as "deionized." Still another variation of the technique is to employ a mixed resin bed, that is, a bed containing a weak base resin in the free base form and a strong acid resin in the hydrogen form whereby the silicic acid sol is formed simultaneously with exchange of its companion ions to produce a substantially deionized polysilicic acid sol.

While the above described methods are preferable to produce the starting acid sol, it must be understood that any appropriate method for producing an acid sol of a requisite molecular weight and pH may also be used. For example, minute amounts of the stabilizer such as alkali metal hydroxide may be used without departing from the scope of the invention as long as the pH is not raised above the operative limits described above.

Rate of addition

A critical aspect of the invention is the proper adjustment of addition of acid sol with the above described characteristics, to the aforementioned particular alkaline silica sol. It has been determined that this rate of addition may be appropriately fixed according to the following rate formula, when the reaction is carried out at the boiling point of the aqueous sol under ambient conditions:

$$F = k C_t^{2/3} C_0^{1/3} S_0$$

where $F$ is the maximum feed rate at any time of the acid silica sol in grams of silica per milliliter of alkaline sol hours, $k$ is a constant with a value of $5 \times 10^{-3}$ under the reaction conditions just stated, $C_t$ is the silica concentration in grams of silica per ml. of the alkaline silica sol at any time, $C_0$ is the initial silica concentration of the alkaline silica sol, $S_0$ is the initial specific surface area of the silica alkaline sol in square meters per grams of $SiO_2$, all silica contents being expressed as $SiO_2$ by weight.

The above feed rate equation was derived as follows:

It has been found that the active silica concentration from the acid sol when added to the alkaline sol is constant in the reaction mixture. Therefore, the feed rate is directly proportional to the rate of disappearance of active silica in the acid sol. It has also been found that all the active silica of the acid sol combines with the "seed" silica particles of the alkaline sol below a certain active silica concentration in the reaction system. Therefore, the maximum feed rate for the desired particle growth which will define the active silica concentration of the acid sol may be obtained as follows:

Equation I
$$F = kS'$$

where $F$ is the maximum feed rate of the acid sol in grams of $SiO_2$ per ml. of alkaline sol per hour, $S'$ is the silica surface area of the alkaline sol silica particles in square meters per ml. of alkaline sol, and $k$ is a constant.

Equation I restricts reaction to the surface silica particles since only such reaction would be possible with the dense, non-porous silica particles of the alkaline sol which are employed. Therefore, Equation II
$$S' = SC$$

where $S$ is the specific surface area in $M^2$/grams $SiO_2$ of the alkaline sol and $C$ is the silica concentration in grams $SiO_2$/ml. of the alkaline sol.

$$\left(C = \text{percent } \frac{SiO_2}{100} \times \text{density of sol}\right)$$

Combining Equations I and II, $F = kSC$. The initial feed rate then is given by:

Equation III
$$F_0 = kS_0 C_0$$

where $S_0$ and $C_0$ describe the initial specific surface area and concentration of the alkaline sol and $F_0$ is the initial feed rate.

The feed rate at any time, $t$, is therefore given by the following equation:

Equation IV
$$F_t = kS_t C_t$$

In order to determine $S$, the surface area per gram of $SiO_2$, the following derivation is made:

The volume of an average particle is given, by the volume of a sphere, that is, $$V = \frac{\pi d^3}{6}$$

where $d$ is diameter of an average particle. The weight of this particle is given by $$W = V\rho = \frac{\pi d^3 \rho}{6}$$

where $\rho$ is the density in grams/ml. The number of particles, $n$, in one gram is then $$\frac{1}{\frac{\pi d^3 \rho}{6}} = \frac{6}{\pi d^3 \rho} = n$$

The surface area of an average particle is given by $s = \pi d^2$. Also, $s = S/n$ therefore, $S = ns$. Concluding $$S = \left(\frac{6}{\pi d^3 \rho}\right)(\pi d^2) = \frac{6}{\rho d}$$

In ideal particle growth, all acid silica feed will accrete on particles already present, with no new particles formed. In addition, it is assumed there is no agglomeration of particles.

The number of particles in one ml. of sol containing $C$ grams/ml. of silica is given by $$n = \frac{C}{\pi d^3 \rho / 6}$$

where $d$ is the average particle diameter and $\rho$ is the density.

Initially, $$n_0 = \frac{C_0}{\pi d_0^3 \rho / 6}$$

Since the concentration of particles remains constant during the growth process, at any time, $t$, $$n_0 = \frac{C_t}{\pi d_t^3 \rho / 6}$$

combining Equations 2 and 3

(4) $$d_t/d_0 = (C_t/C_0)^{1/3}$$

the relation between initial and final particle diameters and silica concentrations in an ideally grown sol.

Therefore, the specific surface area per gram of silica particle at any time is:

Equation V
$$S_t = \frac{A}{d_0}\left(\frac{C_0}{C_t}\right)^{1/3}$$

By inserting Equation V in Equation IV the following equation is derived:

Equation VI
$$F_t = k\frac{A}{d_0} C_0^{1/3} C_t^{2/3}$$

Finally, by substituting for $A/d_0$ the final rate formula is determined as follows:

Equation VII $\quad F_t = kS_0 C_0^{1/3} C_t^{2/3}$

The value of $k$ is then determined experimentally from the maximum feed rate which gives the desired growth and from the known properties of the alkaline sol. These experimental values are then substituted in Equation III to yield the value for $k$. For aqueous alkaline sols wherein the boil-off is affected at the boiling point of water under atmospheric conditions, $k$ has been determined as $5 \times 10^{-3}$.

It is important to follow a rate of addition of acid sol according to the above formula for two reasons. First, only by following such a defined rate is one able to inhibit the formation of new silica sites in the alkaline silica sol which may occur by polymerization of the acid sol with itself upon addition. In other words, it is necessary to keep the addition rate of the acid sol sufficiently low so that it, in reality, polymerizes upon the surface of the silica particles of the alkaline silica sol rather than condenses with itself in the reaction mixture to form undesirable particles of relatively low weight-average particle diameter. In effect, if the acid sol is allowed to polymerize itself, small polymeric "seeds" are formed which act as acceptors of further amounts of the poymerizable acid sol added thereto. This is to be specifically avoided.

Another very important reason for adhering closely to the terms of the rate formula is to promote uniformity of coating upon the silica particles of the alkaline sol existing in the reaction mixture. If the terms of the rate formula are followed as described, the silica of the acid sol is polymerized and coated upon the silica particles of the alkaine sol in a uniform manner so as to have the requisite spherical character in addition to the increased weight-average particle diameter of the ranges described above. An uncontrolled or random rate of addition results not only in new polymeric sites which promote low weight-average diameters but also would result in non-spherical shaped particles. To achieve particle uniformity and spherical shape it is essential that the silica particles of the alkaline sol be built up or increased in diameter continuously. This is only effectual by following a rate of addition of acid sol defined by the above formula.

By following the defined rate of addition according to the above-described formula it has been determined that the weight-average particle diameter of the silica particle contained in the alkaline silica sol have been increased from 2.5 to 4.0 times in size. More preferably the particle sizes are increased 2.5 to 3.5 times the original starting diameter.

The total time addition of acid sol may range from 8 to 48 hours in length. It has been determined that under the most favorable process conditions the time of addition may vary from 12 to 30 hours and most preferably from 18 to 28 hours. During this time, the amount of silica generally added from the acid sol is 10–30 parts per 1 part of silica contained in the starting alkaline silica sol. However, this figure may vary according to all the variables defined in the rate formula and the particular process equipment employed.

If an acid sol is added to the alkaline silica sol at the appropriate defined rate, the silica particles contained in the reaction mass, that is, the silica particles of the alkaline silica sol, are increased in size from 1–5 millimicrons per hour of reaction time. More preferably the weight-average particle diameter of the silica particles of the alkaline silica sol are uniformly increased 1 to 3 millimicrons per hour.

As mentioned above, it is essential that the alkaline silica sol whose particles are to be built up in magnitude must be maintained at a pH of at least 7.0 and more preferably above 7.2. Whether or not sufficient alkalinity is added in the beginning as a one-step addition or added in appropriate increments during the whole of reaction, it is necessary that the pH be kept on the alkaline side. If such is not done, gelation and/or uneconomical precipitation will occur, and products with the requisite uniformity of size and magnitude of weight-average particle diameter cannot be produced.

During the course of the reaction the temperature of the reaction mixture is kept at about the normal boiling point of the aqueous liquid carrier of the alkaline silica sol or slightly above which, of course, for water is about 100° C. Thus, in effect, while all the particle diameters are being continuously built up, the additional effect of concentration is also taking place so that the final large particle size silica sol is concentrated to a point above 35% solids by weight of $SiO_2$. This evaporation of the liquid phase of the alkaline silica sol, whether it be of water or some appropriate hydrophilic organic reagent, may be accomplished at atmospheric pressure, a pressure somewhat above atmospheric, or under an appropriate vacuum. If a vacuum technique is employed, of course, the boiling temperature of the continuous aqueous liquid phase is lower than at atmospheric conditions and conversely higher if pressure is employed. However, it is preferred because of practical considerations with regard to the process equipment involved, that the evaporation be effected at ambient pressures.

The constant, $k$, in the above rate formula will assume different values if the reaction is run under pressure or vacuum, or if the continuous phase of the sol has a normal boiling point substantially different from that of water. The proper $k$ constant applicable to the particular hydrophilic liquid employed and conditions of evaporation may be determined by proper experimentation by one skilled in the art.

Compositions of the invention

By following the process techniques outlined above in any of their embodiments, concentrated stable alkaline silica sols containing at least 35% by weight, expressed as $SiO_2$, of large, spherical, uniform, non-aggregated silica may be made. These sols contain particles having a weight-average particle diameter of from about 45 to about 100 millimicrons in size. The more preferred products are those with silica particle diameters falling within the range of 45–80 millimicrons and most preferably between 45 and 75 millimicrons. The specific surface area of these products ranges from 35 to 150 $M^2/g$. of $SiO_2$ and preferably from 40 to 100 $M^2/g$. $SiO_2$. A hydrophilic liquid carrier of these sol products may be any hydrophilic organic substance such as lower alkyl alcohols or water, with the most preferable continuous liquid phase being an aqueous phase.

Further investigation of the sol products of the invention show that they all have viscosities of less than 10 cps. at 25° C. measured at 50% $SiO_2$ with the majority of the products having a viscosity within the range of 5 to 10. Also, the sol products have conductivities less than 5000 micromhos with the bulk of the compositions having conductivities within the range of 3000–5000 micromhos measured at 50% $SiO_2$.

If the aforementioned process is run under the most preferred conditions, that is, the liquid carriers of both the alkaline and acid silica sols are water, then the final product will contain water as a continuous phase. This aqueous phase may be exchanged with a hydrophilic liquid by a wide variety of published techniques to yield a concentrated final product having a hydrophilic organic liquid phase and large silica particles of already defined size existing as the solid dispersed phase of the sol product.

The large-particle silica sols so produced are all alkaline in nature with the pH ranging between 7.0 and 10.0 units. However, when the sols are produced by the most preferred process embodiments, their pH falls between 7.5 and 10.0 units.

As mentioned before, the large silica particles so produced are substantially uniform and spherical in shape. Moreover, these particles exist as discrete entities, that is to say, they exist as non-aggregated particles having a plurality of SiOH groups on their surfaces. The most preferred products contain 35–60% by weight of these uniform, large, discrete silica particles. Even more concentrated products are possible by folliwing the practice of the invention. Heretofore, silica particles of such definition and in such concentrations have been unavailable from prior art techniques.

In order to further prove impossibility of forming large, discrete, spherical silica particles having a weight-average particle diameter of from 45 to 100 millimicrons via prior art conventional one-step heel-feed processes as set out in previously discussed patents and others, the following experiments were carried out.

From the above theory it was developed that $$d_t/d_0 = (C_t/C_0)^{1/3}$$

where $d_t$=particle diameter at time $t$, $C_t$=concentration (g./cc.) of sol at time $t$, and $d_0$ and $C_0$ are the initial conditions. It appears then that at least theoretically large particle size silica sols can be made by simply controlling initial heel particle size and concentration. From the equation, it is obvious that the more dilute the heel or the larger the heel particle size, the larger the particle size that can be achieved in the final sol in any desired concentration.

However, certain limiting considerations come into play. First of all, conventional heels are generally prepared by alkalizing acid sols from the method described in Bird, U.S. Patent 2,244,325. The maximum silica particle size in these heels is about 5 millimicrons and generally ranges from about 3 to about 5 millimicrons in particle size. From the above equation and employing initial heel sols of this particle size, it would require initial heel concentrations of less than 0.1% silica solids to theoretically achieve via a one-step process a sol having a final particle size greater than 45 millimicrons. Yet, at such dilute silica concentrations the solubility of amorphous silica, which ranges from 0.015% at room temperature to 0.04% at 100° C. becomes relatively great compared to total amount of silica present. This solubility then becomes a limiting factor in heel development. As an average, then, the lowest silica concentration in a heel sol which can be reached without merely solubilizing the silaca, and thereby completely preventing particle growth is approximately 0.02%.

In order to verify the above, a heel was prepared by alkalizing an acid sol obtained from the Bird process, U.S. Patent 2,244,325, to a pH of 7.0. Specifically, 200 ml. of this sol was placed in a 500 ml., 3-neck flask. Acid silica sol was fed into the alkaline heel at a constant pot volume and within the rate discovered here to be critical. After 23 hours total time, a 50% sol was reached. The product had a particle diameter of 44.2 millimicrons. However these, particles were not uniform in size despite maintaining the feed rate at such a level which was slow enough to prevent nucleation of new particles. In a number of other experiments, the silica concentration was increased. In no instance did any sol even reach the above figure much less a maximum particle diameter of 45 millimicrons. This is true even though the acid sol feed rate described herein was closely followed. In yet other experiments, the pH of the alkaline heel sol was increased. This resulted in silica particle size diameters even lower than those achieved in the above experiments.

Thus, it appears that regardless how one varies all possible process variables in the one-step, heel-feed prior art process, it is impossible to achieve growth of silica particles greater than about 45 millimicrons, and specifically within the range of 45–100 millimicrons. This is true even when one works within the feed rates described herein and found also to be critical. Thus, it is apparent that as an essential necessity, in addition to closely following acid feed rates set out herein, the starting alkaline heel silica sol must have a weight-average diameter of at least 10 millimicrons to achieve the desired large particle silica sols. Such concept was heretofore undiscovered in the art.

EXAMPLES

The invention will be better understood by reference to the following illustrative examples:

Example I 33.5 grams of an aqueous alkaline silica sol containing 50% $SiO_2$ by weight with a pH of 9.0 and a weight-average particle diameter of 21.3 millimicrons were diluted to 800 ml. with deionized water. This alkaline silica sol containing 2.3% $SiO_2$ at a pH of 9.4 was charged to a 1 liter 3-necked flask equipped with a stirrer, calibrated dropping funnel and condenser with an adapted distillate take-off. The contents of the flask were heated to boiling and dilute acid sol (polysilicic acid) containing 4% $SiO_2$ was added. This acid sol had been previously prepared by passing diluted sodium silicate to a strong acid ion exchange resin in the hydrogen form according to the general method outlined by Bird, U.S. Patent 2,244,325. The acid sol was added through the dropping funnel to maintain constant volume in the flask and replace the constantly distilling water which was continuously removed. The heating rate was controlled so as to maintain the boil-off rate at about 350 ml./hr. The pH in the flask was maintained above 8.0 by requisite additions of 1 ml. portions of 40° Bé. sodium silicate ($SiO_2$:$Na_2O$=3.25:1) until the $SiO_2$ content in the flask reaches 15%. After the concentration had reached this point, the pH was maintained between 7.5 and 8.0 by addition of 0.5 ml. portions of sodium silicate of the type described above. The addition of acid sol and boil-off continued at the aforementioned rate until 9.1 liters of active silica solution had been added to the flask, at which point the reaction was stopped. The finished sol product contained 37.4% $SiO_2$ at a pH of 8.05 at 25° C. and a $SiO_2$:$Na_2O$ ratio of 650:1.

The aforementioned addition of acid sol was performed an accordance with the required rate as previously defined by the rate of addition formula above. The average particle diameter of the sol as determined by titration for specific surface area was 48 millimicrons based on a specific surface area of 63 $M^2$/g. This determination was made according to the technique outlined in Anal. Chem. 28, 1981 (1956). When diluted to a solids concentration of 1.25% $SiO_2$ by weight, the sol had an optical density of 0.66 as measured in a ½ inch test tube against a deionized water sample using a Kiett-Summerson Photoelectric Colorimeter Model 900-3 with a No. 44 filter.

The $SiO_2$ concentrations were determined from specific gravity measurements. The pH was measured with a Beckman Mode G pH meter, glass vs. calomel electrodes, which had been calibrated against pH 7 buffer.

Example II

In this example an alkaline silica sol similar to the one used in Example I was used with the exception that 16 ml. of 40° Bé. sodium silicate ($SiO_2$:$Na_2O$=3.25:1) were added to the alkaline sol before heating. The rate of addition of acid sol again conformed to that required and defined by the rate formula of the invention. This gave a total silica concentration of 3.2% $SiO_2$ by weight, and a pH of 10.8 and an optical density of 0.094 at 1.25%.

A total of 7.1 liters of acid sol produced as described in Example I above were added to the flask while maintained a constant volume by distillation of the water phase at a ratio of about 400 ml./hr. The final $SiO_2$:$Na_2O$ ratio was 185:1 and the specific surface area was 68 $M^2$/g., corresponding to an average particle diameter of 45 millimicrons.

Example III 30.5 grams of an aqueous 50% $SiO_2$ sol with a pH of 9.0 and an average particle diameter of 21.3 millimicrons were diluted to 425 ml. with water, giving an alkaline sol containing 3.5% $SiO_2$. A 6% solution of the acid sol produced as described in Example I was fed into the alkaline sol which had been added to a 500 ml. flask. The flask was agitated rapidly and water distilled therefrom to maintain constant volume. The pH of the reaction moisture in the flask was controlled by addition of 1 N NaOH in 1 ml. increments. After the silica concentration reached 20% the pH was maintained between 7.0 and 7.5. After 2.95 liters of acid sol had been added at a rate satisfying the requirements of the rate of addition formula, the alkaline sol in the reaction flask contained 44% $SiO_2$ at a pH of 7.02. The sol in the reaction flask at this time had a viscosity of less than 10 c.p.s. After adjusting the sol to pH of 7.6, it was concentrated by evaporation to 54% $SiO_2$. The final product having this concentration had a pH of 7.47, an average particle diameter of 48 millimicrons, and a $SiO_2:Na_2O$ ratio of 570:1. Storage for 2 months at room temperature showed that the sol product was stable against any type of gelation for at least this period of time.

Example IV

An alkaline silica sol was prepared which contained 50% $SiO_2$ by weight and had an average particle diameter of 22.4 millimicrons. 690 ml. of this 50% sol were added to 6 gallons of soft water and 450 ml. of 40° Bé. sodium silicate were then added to the mixture. This dilute alkaline sol was then charged to a submerged steel tube evaporator. The violent, almost explosive, boiling within the submerged tubes serves to vigorously agitate the entire contents of the evaporator, which is a useful device for obtaining a large heat transfer surface. A centrifugal pump recirculating the evaporator contents to an external line was used in conjunction with the evaporator. Steam pressure was adjusted to give a boil-off rate of about 18 pounds of water per hour. Constant volume was maintained by adding to the alkaline sol a 4.5% acid sol made as outlined in Example I. This acid sol was fed into the recycle line immediately before the pump to insure adequate mixing. During the evaporation the recycle rate was about 0.7 gallon/min. The addition of polysilicic acid sol was continued for 26 hours at a rate of about 2.1 gal./hr., which addition rate conformed to that defined by the above rate formula. After this addition time, the sol in the evaporator had an $SiO_2$ content of 35% with a pH of 8.8 and average particle diameter of 61 millimicrons. At 1.25% $SiO_2$, the sol had an optical density of 0.87.

Example V

This sol product was prepared as generally out-lined in Example IV with the exception that the boil-off rate was maintained at about 24 pounds/hr. for the first 5 hours and 32 pounds/hr. until the run was completed. The total time of addition was 14¾ hours. The finished sol product contained 35.5% $SiO_2$ and had a pH of 8.7. The average particle diameter of the finished sol was 63 millimicrons. When diluted to 1.25% $SiO_2$, the sol had an optical density of 0.84 when measured as generally outlined in Example I. 29.7 pounds of the sol as produced in Example IV were then added to 50 pounds of the sol of this example contained in the evaporator, while water was distilled off to maintain a constant volume. The resultant sol contained 50% $SiO_2$. This product exhibited excellent stability against gelation.

Example VI

A sol product was prepared as described in Example IV with the exception that the boil-off rate was maintained at about 28 lbs. of water per hour throughout the course of the run and acid sol was fed to the evaporator at a rate of approximately 3.3 gal./hr. The total time of addition was 18 hours. The finished sol product contained 35.0% $SiO_2$ and had a pH of 8.6. The average diameter of the silica particles in the finished sol was 29 millimicrons. When diluted to 1.25% $SiO_2$ the sol had an optical density of 0.43. An electron micrograph of a diluted portion of the finished sol showed that, although there were some large particles, there was a great preponderance of smaller particles. The formation of these smaller particles was the result of the higher initial feed rate of the acid sol, and therefore higher active silica concentration in the evaporator, which permitted condensation of the acid sol particles with each other rather than reaction of the acid sol with the silica particles of the alkaline sol. This example demonstrates the necessity of carrying out the silica particle build-up according to a rate defined by the formula above. If one exceeds, as in this example, the maximum limits of rate of addition of acid sol, the resultant products contain silica particles of relatively low particle diameter. This is due to formation of new "seeds" of silica in the alkaline silica sol which act as acceptors for the subsequently added acid silica sol, thus precluding the relatively larger, partially built-up silica particles from finally attaining their preferred large particle size diameters.

Example VII 754 pounds of an alkaline sol containing 35% silica were added to a submerged tube, steel evaporator containing soft water to give a volume of about 1400 gallons. 25 gallons of 40° Bé. sodium silicate were then added to the dilute sol. The diluted alkaline sol contained 2.3% $SiO_2$ before addition of the sodium silicate and the equivalent of 3.2% $SiO_2$ after the silicate addition and had an optical density of 0.126 when measured according to the procedure of Example I. The alkaline sol was brought to a boil and an acid sol (4.3% $SiO_2$), as produced according to the procedure outline in Example I, was added at a rate of approximately 400 gallons per hour for 12 hours. During this time water was continually distilled to maintain constant volume. After 12 hours the addition and boil-off ratios were then increased so that 750 gallons per hour of water was removed. After a total of 24 hours addition of acid sol, the boil-off and acid sol addition were stopped. The resultant sol had an average particle diameter of 73 millimicrons as determined by the aforementioned titration technique and an optical density of 0.920 as measured in Example I. The final solids content was 35.8%.

As readily seen by the foregoing examples, the products of the invention as produced by the novel disclosed process all contain silica particles within the defined limits. These product sols are all relatively concentrated, that is, 35% by weight or above. Moreover, the large particles of silica contained therein are spherical, substantially uniform, and separate entities of 45 millimicrons or greater in particle diameter. Substantially no aggregation takes place during the process, thereby leaving the surface silanol groups free for subsequent modification or reaction. The products when compared to those produced by prior art methods are substantially different with regard to their weight-average particle diameter in particular and also materially vary in their properties of uniformity, non-aggregation, solids concentration, etc.

FIG. 1 is a graph of a typical large particle sol of the invention showing its gradual increase in weight-average particle diameter with increase in concentration. The final sol product had a weight-average particle diameter of close to 80 millimicrons. It is readily seen in the graph that the particle growth is uniform and a straight line function of the concentration of the alkaline sol, when acid sol is added thereto gradually with simultaneous boil-off of the aqueous phase of the alkaline sol.

Figure 2:
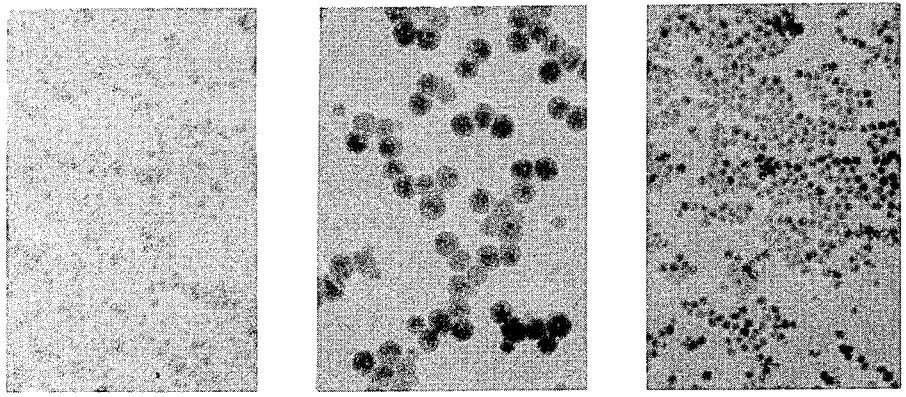

FIG. 2 of the drawing gives a visual comparison of the relative size of products prepared in the instant invention as compared to preparations by process of prior art disclosure. The smaller particles of Section A are those silica particles prepared by a typical run according to the process outlined by Bechtold and Snyder, U.S. Patent 2,574,902. After this typical run had been made, the sol products were prepared for photomicrographic investigation and then so reproduced under a magnification of 65,000×. The average particle size was 15 millimicrons.

Section B of FIG. 2 is a photomicrograph of a typical run according to the method outlined in the instant invention. The sol product obtained from this run had an average particle size of 62 millimicrons and was then magnified 55,000×. The difference between the two sols so compared is clearly evident with regard to their silica particle diameters. Because of the drying and other manipulative techniques necessary to effect good photomicrographic analysis, the particles of both the prior art and the instant invention appear agglomerated. This is illusory. The distinct character of the particular silica entities is evidenced by the definite white border observable around each individual silica particle. An agglomerate would appear as a large solid lump with no observable boundaries between component silica particles. Section C of FIG. 2 is a photomicrograph of silica particles contained in a sol prepared by a typical run according to the process outlined in Reuter, U.S. Patent 2,929,790, mentioned above. This sol was prepared for photomicrographic examination and photographed as shown in FIG. 2, Section C at a magnification of 60,000×. The average particle diameter was 25 millimicrons. Again there is a very obvious difference between silica particle diameters of Section C as compared with Section B of FIG. 2.

The large, silica particles contained in the product sols of the invention may be used for a wide variety of industrial and consumer processes. They are particularly adapted to delusterizing textiles and other materials and are admirably suited as anti-skid agents.

The products of the invention are also compatible with many hydrophilic organic liquids and are capable of being incorporated into a wide variety of chemical products. When combined with other hydrophilic liquids or when used alone, the products may be utilized in the surface modification of plastics, rubber, textiles and the like. Another particular desirable use would be the incorporation of the compositions of the invention in non-gloss varnishes, to accomplish a "flatting" effect.

As indicated above, the compositions of the invention are of value in improving the frictional characteristics of metal surfaces that move one with respect to the other. This would apply to force fitted pinion gears and shafts, or nuts and bolts having mating surfaces coated with colloidal silica. The coefficient of friction between such parts is measurably increased due to the large particle size of the silica contained in the sol products used in their production. The invention is hereby claimed as follows:

I claim:

1. The method of preparing concentrated aqueous stable silica sols containing at least 35% by weight of large, spherical, uniform, non-aggregated silica particles having a weight-average particle of from about 45 to about 100 millimicrons which comprises the steps of adding an aqueous acid silica sol containing silica particles with an average molecular weight less than 90,000 to an aqueous alkaline silica sol containing less than 3.5% by weight of silica particles having a weight-average diameter of from about 10 to about 30 millimicrons, maintaining said addition while continuously evaporating the aqueous liquid phase of said alkaline sol until the weight-average silica particle diameter of the starting alkaline sol is uniformly increased to within said 45–100 millimicron range, said addition being carried out according to the following rate formula:

$$F = kC_t^{2/3}C_0^{1/3}S_0$$

where F is the maximum feed rate at any time of the acid silica sol in grams of silica per milliliter of alkaline sol per hour, $k$ is a constant with a value of $5 \times 10^{-3}$ when the liquid aqueous phase is evaporated under ambient conditions, $C_t$ is the silica concentration of the alkaline silica sol in grams of silica per milliliter at any time, $C_0$ is the initial silica concentration of the alkaline silica sol, and $S_0$ is the initial specific surface area of the silica of the alkaline sol in meters squared per gram of silica, all silica contents being expressed as $SiO_2$ and maintaining the pH of the alkaline sol during the whole of said addition at a value of at least 7.0 units.

2. The method of preparing concentrated aqueous stable silica sols containing at least 35% by weight of large, spherical, uniform, non-aggregated silica particles having a weight-average particle of from about 45 to about 100 millimicrons which comprises the steps of adding an aqueous acid silica sol containing silica particles with an average molecular weight less than 90,000 to an aqueous alkaline silica sol containing less than 3.5% by weight of silica particles having a weight-average diameter of from about 10 to about 30 millimicrons, maintaining said addition while continuously evaporating the aqueous liquid phase of said alkaline sol until the weight-average silica particle diameter of the starting alkaline sol is uniformly increased from 2.5–4.0 times, said addition being carried out according to the following rate formula:

$$F = kC_t^{2/3}C_0^{1/3}S_0$$

where F is the maximum feed rate at any time of the acid silica sol in grams of silica per milliliter of alkaline sol per hour, $k$ is a constant with a value of $5 \times 10^{-3}$ when the liquid aqueous phase is evaporated under ambient conditions, $C_t$ is the silica concentration of the alkaline silica sol in grams of silica per milliliter at any time, $C_0$ is the initial silica concentration of the alkaline silica sol, and $S_0$ is the initial specific surface area of the silica of the alkaline sol in meters squared per gram of silica, all silica contents being expressed as $SiO_2$ and maintaining the pH of the alkaline sol during the whole of said addition at a value of at least 7.0 units.

3. The method of claim 1 wherein the pH of the alkaline sol during the whole of said addition is maintained above 7.0 units by adding in a single addition to the starting alkaline sol sufficient alkalinity so that the pH of said starting sol is from 9.5–11.5, said alkalinity being produced by addition thereto of a compound from the group consisting of alkali metal hydroxide and alkali metal silicate.

4. The method of claim 2 wherein the weight-average silica particle diameter of the starting alkaline sol is increased from 2.5–3.5 times, said starting alkaline silica sol containing silica particles having a weight-average diameter of from about 15 to about 25 millimicrons.

5. The method of preparing concentrated aqueous stable silica sols containing from about 35–60% by weight of large, spherical, uniform, non-aggregated silica particles having a weight-average particle diameter of about 45 to about 70 millimicrons which comprises the steps of adding an aqueous acid silica sol containing silica particles with an average molecular weight of less than 90,000 to an aqueous alkaline silica sol containing from about 0.5 to about 3.5% by weight of silica particles having a weight-average diameter of from about 15 to about 25 millimicrons, maintaining said addition while continuously evaporating the liquid aqueous phase of said alkaline sol until the weight-average silica particle diameter of the starting alkaline sol is increased from 2.5–3.5 times, said addition being carried out according to the following rate formula:

$$F = kC_t^{2/3}C_0^{1/3}S_0$$

where F is the maximum feed rate at any time of the acid silica sol in grams of silica contained therein per milliliter of alkaline sol per hour, $k$ is a constant with a value of $5 \times 10^{-3}$ when the liquid aqueous phase is evaporated under ambient conditions, $C_t$ is the silica concentration in grams of silica per milliliter of the alkaline silica sol at any time, $C_0$ is the initial silica concentration of the alkaline silica sol, and $S_0$ is the initial specific surface area of the silica of the alkaline sol in meters square per gram of silica, all silica contents being expressed as $SiO_2$, and maintaining the pH of the alkaline sol during the whole of said addition above 7.2 units.

6. The method of claim 5 wherein the pH of the alkaline sol during the whole of said addition is maintained above 7.2 units by adding in a single addition step sufficient alkalinity to the starting silica sol so that the pH of said starting sol may vary from about 9.5 to about 11.5, said alkalinity being imparted thereto by a compound from the group consisting of alkali metal hydroxide and alkali metal silicate.

References Cited

UNITED STATES PATENTS

| | | |
|---|---|---|
| 2,443,512 | 6/1948 | Powers et al. |
| 2,577,485 | 12/1951 | Rule. |
| 2,929,790 | 3/1960 | Reuter et al. |

RICHARD D. LOVERING, *Primary Examiner.*

U.S. Cl. X.R.

106—286; 252—309